United States Patent
Liu et al.

(10) Patent No.: US 9,215,666 B2
(45) Date of Patent: Dec. 15, 2015

(54) METHOD AND APPARATUS FOR TRANSMIT POWER CONTROL IN WIRELESS NETWORKS

(75) Inventors: Hang Liu, Yardley, PA (US); Ishan Mandrekar, Monmouth Junction, NJ (US); Mingquan Wu, Princeton Junction, NJ (US); Ramkumar Perumanam, Edison, NJ (US); Saurabh Mathur, Monmouth Junction, NJ (US)

(73) Assignee: THOMSON LICENSING, Issy-les Moulineaux (FR)

( * ) Notice: Subject to any disclaimer, the term of this patent is extended or adjusted under 35 U.S.C. 154(b) by 879 days.

(21) Appl. No.: 13/061,663

(22) PCT Filed: Sep. 3, 2008

(86) PCT No.: PCT/US2008/010345
§ 371 (c)(1),
(2), (4) Date: Mar. 1, 2011

(87) PCT Pub. No.: WO2010/027343
PCT Pub. Date: Mar. 11, 2010

(65) Prior Publication Data
US 2011/0167291 A1 Jul. 7, 2011

(51) Int. Cl.
*H04W 52/08* (2009.01)
*H04W 52/20* (2009.01)
*H04W 52/24* (2009.01)

(52) U.S. Cl.
CPC ............. *H04W 52/20* (2013.01); *H04W 52/08* (2013.01); *H04W 52/245* (2013.01)

(58) Field of Classification Search
CPC ..... H04W 52/00; H04W 52/04; H04W 52/20; H04W 52/245; H04L 1/0001
USPC ................ 713/340; 370/318; 455/63.1, 67.13
See application file for complete search history.

(56) References Cited

U.S. PATENT DOCUMENTS

| | | | |
|---|---|---|---|
| 6,987,955 | B1 | 1/2006 | Sapozhnykov et al. |
| 7,480,280 | B2 | 1/2009 | Proctor |

(Continued)

FOREIGN PATENT DOCUMENTS

| | | |
|---|---|---|
| CA | 2306178 A1 | 11/2000 |
| JP | 2002232943 | 8/2002 |

(Continued)

OTHER PUBLICATIONS

International Search Report for PCT/US2008/010345 dated May 29, 2009.

*Primary Examiner* — Kim Huynh
*Assistant Examiner* — Brandon Kinsey
(74) *Attorney, Agent, or Firm* — Robert D. Shedd; Jeffrey M. Navon; Catherine A. Cooper (57) ABSTRACT

A method and apparatus are described including receiving, by a transmitter, a report from an associated client, setting and using a downlink transmit power level responsive to the report for data transmissions to the associated client, determining a downlink data loss rate and adjusting the downlink transmit power level responsive to the downlink data loss rate, wherein said report includes received signal strength, client transmit power level and one of link margin and receiver sensitivity. Also described are a method and apparatus including receiving, by a receiver, a request for a report, transmitting the requested report, receiving an instruction to use an uplink transmit power level, setting and using the uplink transmit power level, determining an uplink data loss rate and adjusting the uplink transmit power level responsive to the uplink data loss rate, wherein said report includes said received signal strength, client transmit power level and one of said link margin and said receiver sensitivity.

18 Claims, 6 Drawing Sheets

(56) References Cited

U.S. PATENT DOCUMENTS

| | | |
|---|---|---|
| 2001/0012276 A1 | 8/2001 | Tsunehara et al. |
| 2005/0128970 A1 | 6/2005 | Tsien |
| 2007/0099567 A1* | 5/2007 | Chen et al. .................. 455/41.2 |
| 2007/0105501 A1* | 5/2007 | Shen et al. .................. 455/63.1 |
| 2007/0165526 A1* | 7/2007 | Lee .............................. 370/230 |
| 2009/0054002 A1* | 2/2009 | Urushihara et al. ....... 455/67.13 |
| 2009/0176454 A1* | 7/2009 | Chen et al. .................. 455/63.1 |
| 2009/0190558 A1* | 7/2009 | Strutt et al. .................. 370/332 |
| 2010/0165857 A1* | 7/2010 | Meylan et al. ............... 370/252 |

FOREIGN PATENT DOCUMENTS

| | | |
|---|---|---|
| JP | 200360557 | 2/2003 |
| JP | 200848454 | 2/2008 |
| WO | 0057576 A1 | 9/2000 |

\* cited by examiner

METHOD AND APPARATUS FOR TRANSMIT POWER CONTROL IN WIRELESS NETWORKS

This application claims the benefit, under 35 U.S.C. §365 of International Application PCT/US08/010345, filed 3 Sep. 2008, which was Published in accordance with PCT Article 21 (2) on 11 Mar. 2010 in English.

FIELD OF THE INVENTION

The present invention relates to communication systems in general and, in particular, the automatic transmit power control in wireless networks especially in densely deployed environments.

BACKGROUND OF THE INVENTION

As used herein, "/" denotes alternative names for the same or similar components or structures. That is, a "/" can be taken as meaning "or" as used herein. Unicast transmissions are between a single sender/transmitter and a single receiver. Broadcast transmissions are between a single sender/transmitter and all receivers within receiving range of the transmitter. Multicast transmissions are between a single sender/transmitter and a subset of the receivers within receiving range of the transmitter where the subset of receivers with receiving range of the transmitter may be the entire set. That is, multicast may include broadcast and is therefore a broader term than broadcast as used herein. Data/content is transmitted in packets or frames. As used herein a station can be a node or a client device, which can be a wireless terminal, wireless device, mobile terminal or mobile device such as, but not limited to, a computer, laptop, personal digital assistant (PDA) or dual mode smart phone. Specifically, a wireless device may be a mobile device but a wireless device may also be fixed and not moving for a particular period of time.

Recently there has been a rapid and significant increase of wireless network deployment on school and work campuses, in shopping malls, at libraries, airports, at homes, etc. Emerging technologies such as IEEE 802.11n make delivering multimedia content over wireless links possible. Thus, the technology is being driven deeper into our daily lives. The number of interference free channels is limited. In a dense deployment environment, wireless networks tend to interfere with each other. This interference impacts the throughput of wireless networks and thus, the quality of service for multimedia streaming applications.

In the prior art, a transmit power control algorithm was proposed to reduce interference and increase capacity in IEEE 802.11 wireless networks. That method adapted the transmit power based on the packet loss rate alone. However, that method needed certain samples to obtain an accurate packet loss rate, leading to a long measurement cycle and slow response time to the channel condition changes. In addition, it is difficult to accurately adapt the transmit power based solely upon the packet loss rate.

SUMMARY OF THE INVENTION

A wireless/mobile/client device associates and communicates only with its nearby AP. By properly controlling the transmit power of an AP and its associated wireless devices, the communications between the AP and the client devices is improved through decreased channel interference, increased channel reuse and improved throughput. If the transmit power can be reduced then the signal transmitted by the AP or the client devices will not interfere with the communications between another AP and its associated client devices at a certain distance. The distance at which there will not be interference between APs depends upon the transmit power of each AP and it associated client devices. That is, APs and their associated clients that are greater than a certain distance apart (have greater than a certain separation) will not interfere with each other and, thus, can reuse the same channel without interference. This principle allows a number of basic service sets (BSSs) (an AP and it associated client devices) to communicate at the same time in a given area while using only a limited number of wireless channels.

The less the transmit power, the less spatial interval is needed to reuse the same channel without interference. Thus, the overall network capacity in a dense deployment is increased. For example, in a given area, with a cellular network, a smaller cell size with less transmit power leads to the higher overall network capacity. The objective is to control the transmit power of a wireless device (AP or client device) such that the device uses minimum transmit power while meeting the requirements for throughput and packet loss rate. Transmit power control helps reduce interference with other devices, improve channel reuse, and eventually increase the overall capacity in wireless networks. Of course, transmit power control also helps conserve energy and improve the battery life of mobile devices.

A transmitter can use low power to transmit data/content/signals when the receiver is close to the transmitter and there are good channel conditions between the transmitter and receiver. However, when the distance between a transmitter and a receiver is greater and the channel conditions are not good, the transmitter needs to use higher power to transmit data in order to ensure the data are received correctly by the receiver and to maintain the throughput. The challenge is how a transmitter determines and adapts (if the channel conditions change) its transmit power to transmit data/content/signals to a receiver optimally.

The present invention is directed to a transmit power control method and apparatus that optimizes the transmitter power to reduce the interference, improve channel reuse and overall network capacity as well as conserving energy while meeting the requirements for throughput and packet loss rate. The present invention is, thus, directed to transmit power control in wireless networks especially in densely deployed environments. Reduction of transmit power while maintaining quality of service results in decreased interference and increased channel reuse, which further improves throughput for all applications but especially for multimedia applications. The method of the present invention cognitively adjusts the transmit power based on active monitoring of several parameters including received signal strength at the receiver as well as the packet loss rate. While the present invention is described and exemplified using an IEEE 802.11 wireless local area network (WLAN), the present invention can be used in any wireless network.

A method and apparatus are described including receiving, by a transmitter, a report from an associated client, setting and using a downlink transmit power level responsive to the report for data transmissions to the associated client, determining a downlink data loss rate and adjusting the downlink transmit power level responsive to the downlink data loss rate, wherein said report includes received signal strength, client transmit power level and one of the link margin and receiver sensitivity. Also described are a method and apparatus including receiving, by a receiver, a request for a report, transmitting the requested report, receiving an instruction to use an uplink transmit power level, setting and using the uplink transmit power level, determining an uplink data loss rate, and adjusting the uplink transmit power level responsive to the uplink data loss rate, wherein said report includes said received signal strength, client transmit power level and one of said link margin and said receiver sensitivity.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

To determine the transmit power, an AP requests each of its associated wireless clients/stations (STAs)/mobile devices to measure its received signal strength and to report its estimated/determined link margin as well as its current transmit power. The AP issues transmit power control (TPC) measurement request message/packet/frame/signal to each of its associated clients periodically. In addition, once a new client is associated, the AP issues a request to the newly associated client. The requested client measures the received signal strength, estimates/determines the link margin for the downlink and reports the estimated/determined link margin, the received signal strength and it's transmit power to the AP by sending a TPC measurement report message/frame/signal. As used herein the downlink is the transmission from the AP to the client, and the uplink is the transmission from the client to the AP. The link margin estimation/determination is described below.

Based on the TPC measurement report message/signal/frame, the AP determines its target/desired downlink transmit power. The transmit power must meet the throughput and packet loss rate requirements while generating the least interference to other devices in the neighborhood/area/spatial interval. The AP also determines the desired/target transmit power of its associated clients and instructs the clients to use the determined power for uplink transmission. The transmit power is individual to a given associated client and therefore, in a time division multiple access (TDMA) environment is on a per packet/frame basis or per timeslot basis.

Figure 1:
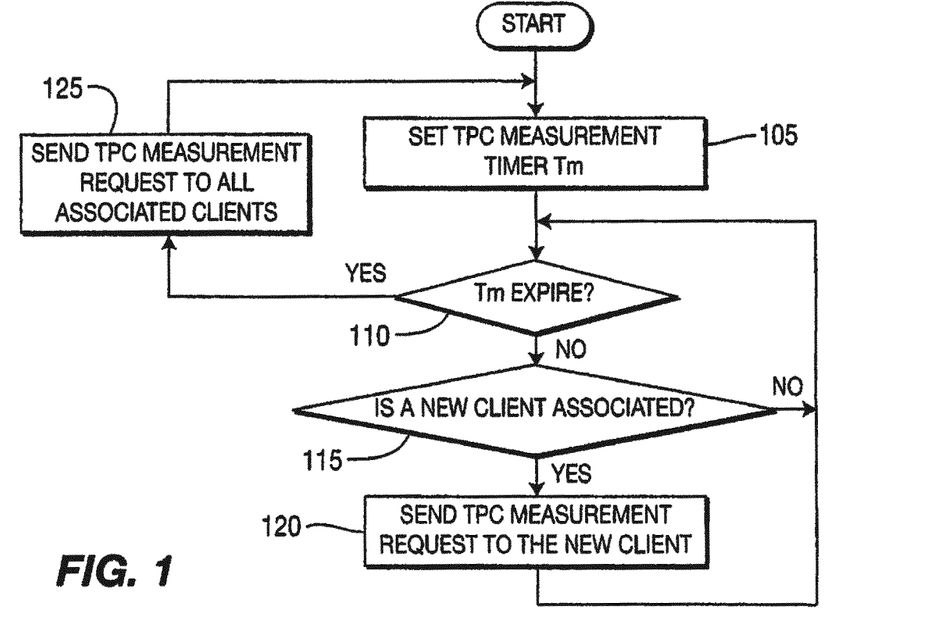
FIG. 1 is a flowchart depicting an exemplary embodiment of an AP transmit power control (TPC) measurement operation in accordance with the principles of the present invention.

FIG. 1 is a flowchart depicting an exemplary embodiment of an AP transmit power control (TPC) measurement operation in accordance with the principles of the present invention. At 105, the AP sets a TPC measurement timer. A test is performed at 110 to determine if the TPC measurement timer has expired. If the TPC measurement time has not expired then a test is performed at 115 to determine if a new client has associated ith the AP. If a new client has associated with the AP then at 120 a TPC measurement request is sent/transmitted to the new client. Processing then continues at 110. If no new client has associated with the AP then processing continues at 110. If the TPC measurement timer has expired then TPC measurement requests are sent/transmitted to all clients associated with the AP at 125.

The TPC method of the present invention constrains the transmit power to be as low as possible while maintaining a target data rate $R_t$ and a target packet loss rate. In an exemplary embodiment, the target data rate is set to be the highest supported data rate by the transmitter and receiver. The reason is that the airtime is the smallest to transmit a frame using the highest data rate so that the time that a transmitter interferes with other devices is minimized. Typically, for a particular transmission data rate, i.e. a specific modulation and channel coding scheme used for the transmission, a receiver has a sensitivity requirement for the received signal power in order to receive and decode the signal/frame within an acceptable packet/frame/data loss rate. The target packet/frame/data loss rate can be set to be the same value as that of the acceptable packet/frame/data loss rate to determine the receiver sensitivity requirement. In another approach, the target packet/frame/data loss rate can be set to a value small enough to ensure the quality of service. It is possible to select other values for the target data rate and/or the target packet/frame/data loss rate in different ways.

For a client i, to guarantee the target data rate, the targeted received power $P_{ri}$ is equal to t arg et$P_{ri}=S_{ti}+D$ where $S_{ti}$ is the receiver sensitivity for the target data rate and D is the margin above the receiver sensitivity. D is a design/tuning parameter. Note that the units in the above equation and the following equations, unless otherwise specified, are decibels.

If the path loss is $L_i$, then the targeted transmit power is t arg et$P_{ri}=L_i+S_{ti}+D=I_i+D$ where $I_i$ defined as $I_i=L_i+S_{ti}$. The link margin $M_i(j)$ in the TPC report for the jth measurement is $M_i(j)=P_{ri}(j)-S_{ti}$. Note that $P_{ri}(j)$ is the jth sample of the received power measured at the receiver. The jth sample of $I_i$ is then estimated/determined by $I_i(j)=L_i(j)+S_{ti}=P_{ri}(j)-P_{ti}(j)+S_{ti}=P_{ti}(j)-M_i(j)$ where $P_{ti}(j)$ is the actual transmit power of the jth TPC measurement request. Note that if the AP wants the receiver to calculate the value of M using the value of $S_{ti}$; (that is, the sensitivity to calculate M) for the data rate at which the TPC measurement request is transmitted, i.e. if the AP wants the receiver to consider the data rate for transmitting TCP measurement request frame to be the target data rate, the AP transmits the TPC measurement request at the target data rate. If the TPC measurement request is not transmitted at the target data rate, the value of M can be converted to the one for the target data rate at the receiver or at the AP. If the value of M (that is a function of the sensitivity) is the one for the targeted data rate (that is, the sensitivity for the targeted data rate was used to calculate the value of M,) no conversion is needed.

A standard linear estimation/determination method is used to calculate $I_i$.

$$aveI_i(j)=\alpha \times aveI_i(j-1)+(1-\alpha)I_i(j)$$

$$\Delta I_i(j)=|I_i(j)-aveI_i(j)|$$

$$varI_i(j)=\beta \times varI_i(j-1)+(1-\beta)\Delta I_i(j)$$

where $aveI_i(j)$ is the smoothed link quality $I_i$ (path loss plus receiver sensitivity) after the jth measurement, i.e. the estimator of the average. $varI_i(j)$ is the smoothed mean deviation of link quality $I_i$. $\Delta I_i(j)=|I_i(j)-\text{ave}I_i(j)|$ is the difference between the jth measured value just obtained and the current estimation/determination of the average. Both $\text{ave}I_i(j)$ and $\text{var}I_i(j)$ are used to calculate the estimated value of $I_i$. The estimated/determined value of $I_i$ is equal to $\tilde{I}_i(j)=\text{ave}I_i(j)+q\times \text{var}I_i(j)$ where $\alpha$, $\beta$, and q are design tuning parameters.

The new estimated/determined value of the desired/target transmit power for client i is then equal to $\tilde{P}_{ti}=\tilde{I}_i+D$. When the AP transmits data packets/frames to client i or a destination i, the AP sets and uses the transmit power equal to $\tilde{P}_{ti}=\tilde{I}_i+D$. That is, the transmit power is controlled per client or per destination address or per wireless link. Different transmit power values are used for different clients/receivers or destination addresses. That is, in a TDMA environment the transmit power is controlled on a per packet basis or a per timeslot basis.

Figure 2:
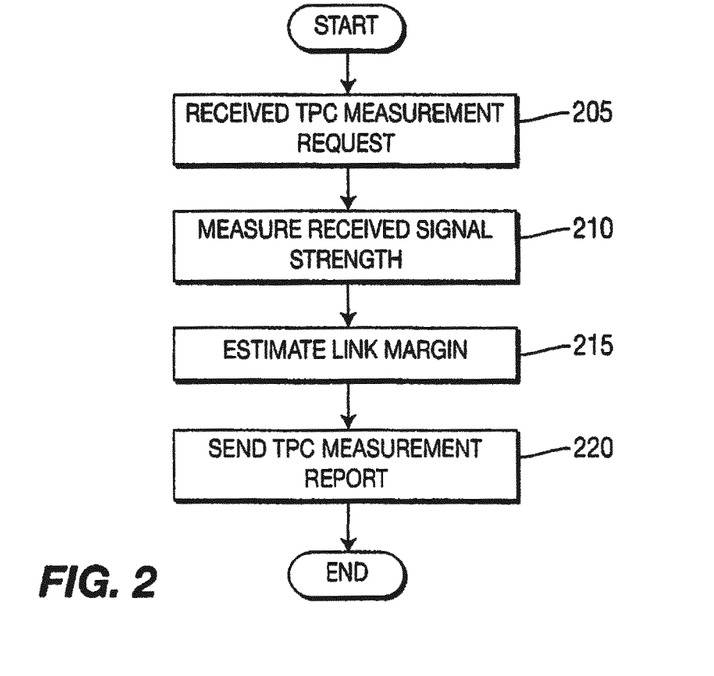
FIG. 2 is a flowchart of an exemplary embodiment of a TPC measurement operation at the client side in accordance with the principles of the present invention.

FIG. 2 is a flowchart of an exemplary embodiment of a TPC measurement operation at the client side in accordance with the principles of the present invention. A client receives a TPC measurement request from the AP with which it is associated at 205. At 210, the client measures its received signal strength (the strength of the transmit signal it receives from downlink traffic/content/data sent/transmitted to it from its associated AP). Using the methods described herein the client estimates/determines the link margin. The client then sends/transmits a TPC measurement report to its associated AP at 220. In another approach, the client sends the received signal strength measurement and its receiving sensitivity to the requested AP in the TCP measurement report, the AP calculates the downlink margin.

In an alternative embodiment, the AP does not change its transmit power per client. The AP determines its transmit power based on the worst client. It selects a transmit power value to ensure that the received signal strength at its worst client is high enough for the client to successfully decode the received frames that are transmitted at the target data rate. If multiple clients are associated with an AP, the AP's transmit power is $$\tilde{P}_t = \max_i \{P_{ti}\}$$

When an AP boots up, its initial power is the maximum supported power, that is $P_t(0)=\max P$. When a new client powers up and associates with the AP again, the AP uses the maximum supported transmit power for this client as its initial value, that is, $P_{ti}(0)=\max P$. Furthermore, when a new client associates with the AP, the AP issues a TPC measurement request for this new client after its association process is complete.

To prevent sudden deterioration of link quality or link/path loss, for example, if a client moves away. The AP also monitors its packet/frame loss rate and adjusts the transmit power based on the packet/frame loss rate. The AP monitors the packet/frame loss rate by noting the number of retransmission requests.

In one exemplary embodiment, the AP periodically determines its packet/frame loss rate (FIR) for its downlink transmissions to its associated clients. If the FLR during a time interval is greater than a threshold $F_T$, i.e. $FLR>F_T$, the AP increases its transmit power to each of its associated client by a value Pd. $F_T$ and Pd are design tuning parameters. If the current AP transmit power for the transmission from the AP to client k is Ptk, the new transmit power for the AP transmission to client k is the smaller value of Ptk+Pd and the maximum transmit power supported by AP, max P, i.e. new Ptk=min{Ptk+Pd, max P}.

Figure 3:
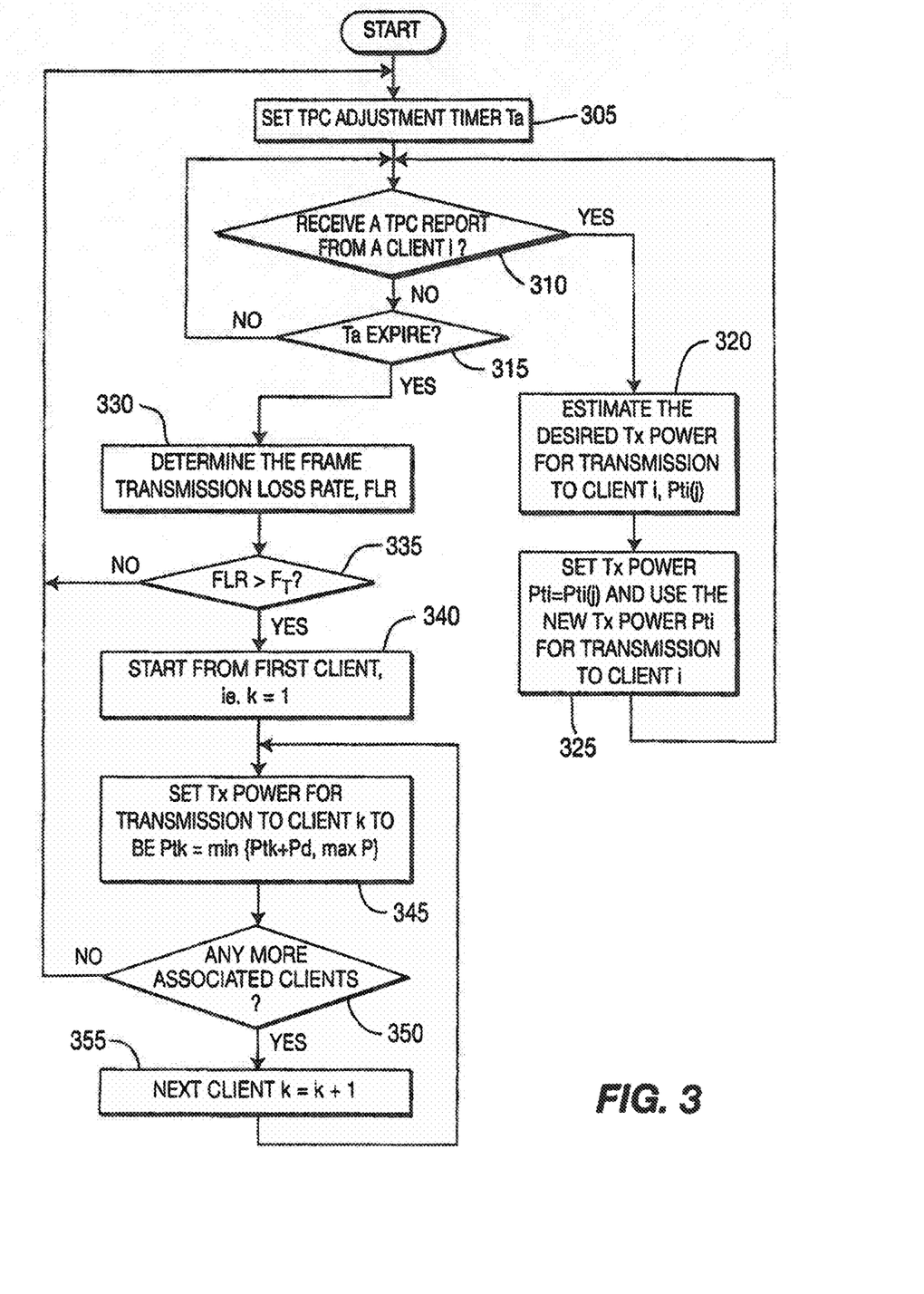
FIG. 3 is a flowchart of an exemplary embodiment of an AP transmit power control (TPC) procedure in accordance the principles of the present invention.

FIG. 3 is a flowchart of an exemplary embodiment of an AP transmit power control (TPC) procedure using the TPC measurement report(s) from client(s) in accordance the principles of the present invention. At 305 the AP sets the TPC adjustment/update timer. A test is performed at 310 to determine if a TPC measurement report has been received from a client. If a TPC measurement report has not been received from a client then a test is performed at 315 to determine if the TPC adjustment timer has expired. If the TPC adjustment/update timer has not expired then processing continues at 310. If the TPC adjustment/update timer has expired then a determination of the packet/frame loss rate is made at 330. A test is performed at 335 to determine if the packet/frame loss rate is greater than a threshold. If the packet/frame loss rate is less than or equal to the threshold then processing continues at 305. If the packet/frame loss rate is greater than a threshold then at 340 a client counter is initialized/set. At 345 the downlink transmit power is set/updated for the client. The new downlink transmit power is used in all future downlink transmissions to the client until the downlink power is changed by the methods described herein. A test is performed at 350 to determine if there are any more clients associated with the AP. If there are no more clients associated with the AP then processing continues at 305. If there are any more clients associated with the AP then the client counter is incremented and processing continues at 345.

If a TPC measurement report was received from a client then at 320 the AP estimates/determines the desired downlink transmit power for the client from which the TPC measurement report was received. At 325 the AP sets/updates the downlink transmit power for the client from which the TPC measurement report was received and uses the updated downlink transmit power in all future downlink transmissions to the client until the downlink power is changed by the methods described herein. Processing then continues at 310.

In another exemplary embodiment, the AP performs the packet/frame loss rate measurement for its transmissions to each of its associated client individually, i.e. the AP maintains the information on a per link packet/frame loss rate. Specifically, the AP maintains a window of transmission status for Nkt frames that were most recently transmitted to its associated client k (k=1, 2, . . . ). If for client k, the packet/frame loss rate FLRk=Nke/Nkt>$F_T$, the AP adjusts its transmit power for its transmission to client k. Nke is the number of lost or retransmitted frames out of the last Nkt frames/packets transmitted to client k by the AP. If the current AP transmit power to client k is Ptk, the new transmit power for the AP transmission to client k is the smaller value of Ptk+Pd and the maximum power supported by AP, max P, i.e. new Ptk=min{Ptk+Pd, max P}. Nkt, $F_T$ and Pd are the design tuning parameters.

Figure 4:
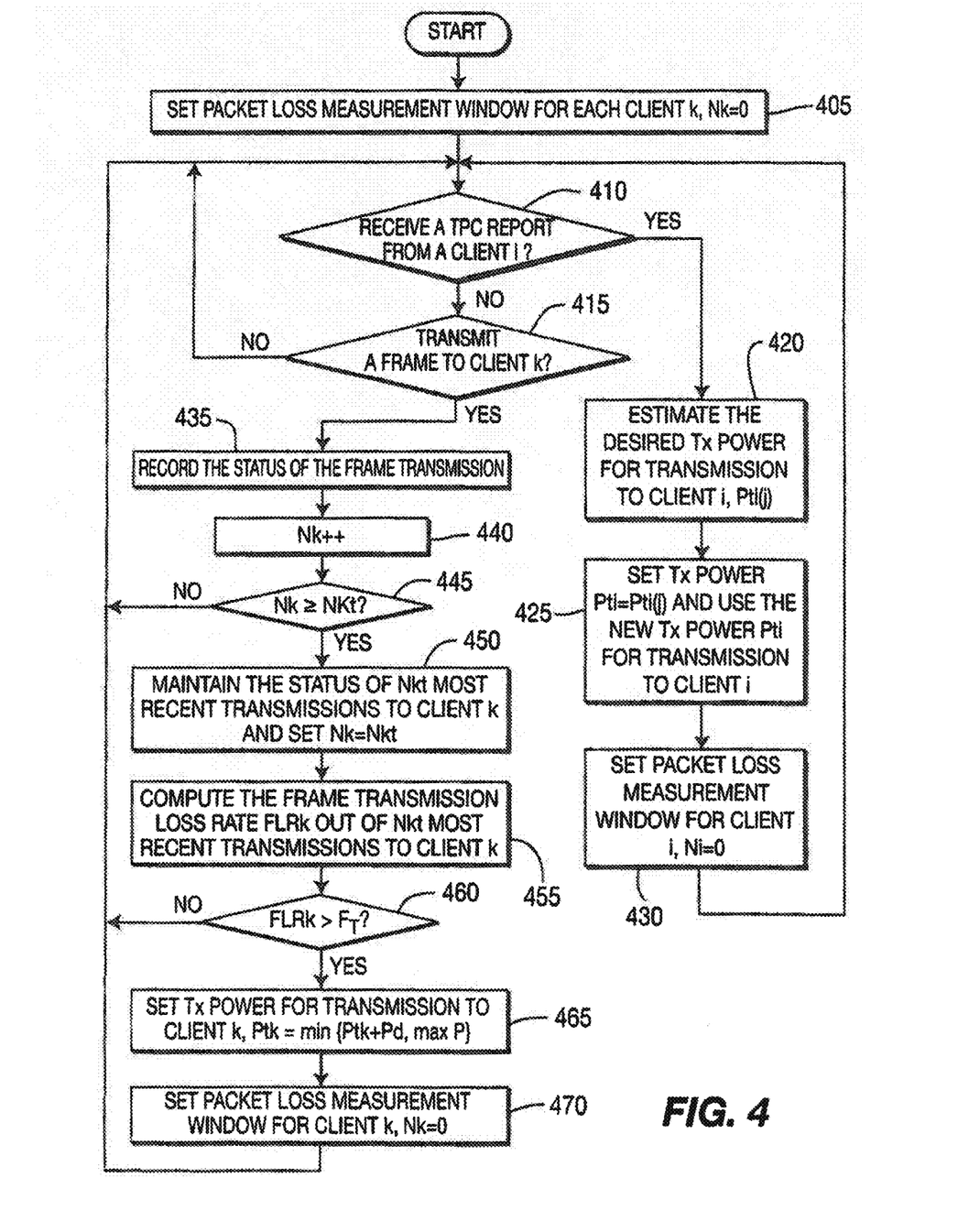
FIG. 4 is a flowchart of an exemplary embodiment of an AP transmit power control (TPC) procedure when the AP has the information on the per link packet/frame loss rate in accordance with the principles of the present invention.

FIG. 4 is a flowchart of an exemplary embodiment of an AP transmit power control (TPC) procedure when the AP has the information on the per link packet/frame loss rate in accordance with the principles of the present invention. At 405 the AP sets/initializes the packet/frame loss measurement window for each client associated with it. A test is performed at 410 to determine if the AP has received a TPC measurement report from a client associated with it. If the AP has not received a TPC measurement report from a client associated with it then a test is performed at 415 to determine if the AP has transmitted any data/packets/frames to the associated client. If the AP has not transmitted any data/packet/frame to the associated client then processing continues at 410. If the AP has transmitted data/packets/frames to the associated client k then the AP records the status of the data/packet/frame transmission at 435. The packet/frame loss measurement window for client k is incremented at 440. A test is performed at 445 to determine if the current packet/frame loss measurement window for client k is greater than or equal to the measurement-required number of packets/frames transmitted to this associated client, Nkt. If the packet/frame loss measurement window is less than the measurement-required number of packets/frames transmitted to this associated client, Nkt, then processing continues at 410. If the packet/frame loss measurement window is greater than or equal to the measurement-required number of packets/frames transmitted to this associated client, Nkt, then at 450 the AP maintains the status of the Nkt packets/frames most recently transmitted to this associated client and resets the packet/frame loss measurement window to Nkt. At 455 the AP calculates/computes/determines the packet/frame transmission loss rate for this associated client k. A test is performed at 460 to determine if the packet/frame transmission loss rate for this client is greater than a threshold. If the packet/frame transmission loss rate for this client is less than or equal to the threshold then processing continues at 410. If the packet/frame transmission loss rate for this client is greater than a threshold then at 465 the AP sets/updates the transmit power for this client. At 470 the AP resets the packet/frame measurement window for this client.

If the AP has received a TPC measurement report from this associated client i then at 420 the AP estimates/determines the desired/target transmit power for downlink transmissions from the AP to the client i from which the TPC measurement report was received. At 425 the AP sets/updates the downlink transmit power for the client i from which the TPC measurement report was received and uses the updated downlink transmit power in all future downlink transmissions to this client i until the downlink power is changed by the methods described herein. At 430 the AP resets the packet/frame loss measurement window for the client i from which the TPC measurement report was received. AP may receive a TPC report from client i and transmit a downlink frame to client k. Processing then continues at 410.

The AP also controls the transmit power of its associated clients. The target data rate and the target packet loss rate for uplink transmissions may be different from the downlink data rate. As an exemplary embodiment, the highest supported data rate can be used as the target uplink data rate. For a particular transmission data rate, i.e. a specific modulation and channel coding scheme used for the transmission, a receiver has a sensitivity requirement for the received signal power in order to receive and decode the signal/frame within an acceptable packet/frame/data loss rate. The target packet/frame/data loss rate can be set to be the same value as the acceptable packet/frame/data loss rate to determine the receiver sensitivity requirement. In another approach, the target packet/frame/data loss rate can be set to a value small enough to ensure the quality of service. It is possible to select other values for the target data rate and/or the target packet/frame/data loss rate in different ways.

Note that the quality of the uplink and the downlink may not be symmetric. For a client i, to guarantee the target data rate, the targeted received power $P_{uri}$ at the AP is equal to t arg et$P_{uri}$=$S_{uri}$+U where $S_{uri}$ is the AP receiving sensitivity for the target data rate and U is the uplink margin over the receiver sensitivity. U is a design tuning parameter.

If the path loss for the uplink is $L_{ui}$, the targeted client transmit power is then t arg et$P_{uti}$=$L_{ui}$+$S_{uri}$+U. The AP can estimate the path loss $L_{ui}$ based on the actual client transmit power $P_{uti}$ in the TPC measurement report and the actual received power $P_{uri}$ at the AP. That is, $L_{uti}$=$P_{uti}$−$P_{uri}$ Once again, a standard linear estimation/determination method is used to calculate the uplink path loss $L_{ui}$.

$$aveL_{ui}(j)=\sigma \times aveL_{ui}(j-1)+(1-\sigma)L_{ui}(j)$$

$$\Delta L_{ui}(j)=|L_{ui}(j)-aveL_{ui}(J)|$$

$$varL_{ui}(j)=\omega \times varL_{ui}(j-1)+(1-\omega)\Delta L_{ui}(j)$$

where $aveL_{ui}(j)$ is the smoothed link quality $L_{ui}$ (path loss plus receiver sensitivity) after the jth measurement, i.e. the estimator of the average. var $L_{ui}(j)$ is the smoothed mean deviation of link quality $L_{ui}$. $\Delta L_{ui}(j)=|L_{ui}(j)-aveL_{ui}(j)|$ is the difference between the jth measured value just obtained and the current estimation of the average. Both $aveL_{ui}(j)$ and var $L_{ui}(j)$ are used to calculate the estimated value of $L_{ui}$. The estimated/determined value of $L_{ui}$ for the jth sample is equal to $\tilde{L}_{ui}(J)=aveL_{ui}(j)+c\times varL_{ui}(j)$, where σ, ω, and c are the design tuning parameters.

The estimated/determined new uplink transmit power is equal to $\tilde{P}_{uti}=\tilde{L}_{ui}+S_{uri}+U$. The AP instructs the client to use the new transmit power by sending a message the client. When a client transmits data packets/frames to its associated AP the client uses the new transmit power equal to $\tilde{P}_{uti}=\tilde{L}_{ui}+S_{uri}+U$. That is, the transmit power is controlled on a per client or per wireless link basis. Different uplink transmit power values are used by different clients or on different links/paths.

In an alternative embodiment, the AP may want all the clients to use the same transmit power for uplink transmissions. The AP then determines the uplink transmit power based on the worst client. If multiple clients are associated with an AP, the uplink transmit power is $\tilde{P}_{ut}=\max\{P_{uti}\}$.

When a client boots up and initializes operations, its initial power can be the maximum supported power by this client $P_{u-supported}$. Alternatively, it can be the maximum allowed transmit power specified in the AP beacons or probe responses $P_{u-allowed}$, or the minimum of the maximum supported power and the maximum allowed transmit power, that is, $P_{ut}(0)=\min\{\max P_{u-supported}, \max P_{u-allowed}\}$ A new client uses this maximum power for association process and the following transmissions until it successfully receives an instruction to change its transmit power. When a new client associates with the AP, the AP issues a TPC measurement request to this new client after its association process is complete. After receiving the TPC measurement report from this client, the AP determines and adapts the uplink and downlink transmit power for this client. The updated uplink transmit power value is sent to the client using a management/control message or advertised in a beacon message/signal/frame to direct/instruct the client to use the new transmit power value for uplink transmissions.

To prevent the sudden deterioration of link quality or link/path loss, the AP also monitors its packet/frame loss rate. In one exemplary embodiment, the AP periodically determines its packet/frame loss rate (FLR) for its downlink transmissions to its associated clients. If the FLR during a time interval is greater than a threshold $F_T$, i.e. FLR>$F_T$, the AP adjusts its downlink transmit power to each of its associated client as described above. In the meantime, the AP also instructs/directs each of it associated clients to increase their uplink transmit power. This is accomplished as described below. If the current uplink transmit power for client k is Putk, the new transmit power for the client k uplink transmission to the AP is the smaller value of Putk+Pud and the maximum uplink power supported by the client, max Puk, i.e. new Putk=min{Putk+Pud max Puk}. $F_T$ and Pud are the design tuning parameters.

In another exemplary embodiment, the AP performs the packet/frame loss rate measurement for its transmission to each of its associated client individually, i.e. the AP maintains the information of per link packet/frame loss rate. Specifically, the AP maintains a window of transmission status for Nkt frames that were most recently transmitted to its associated client k (k=1, 2, . . . ). If for client k, the frame loss rate FLRk=Nke/Nkt>$F_T$, as described above, the AP adjust its transmit power for downlink transmissions to client k, where Nke is the number of lost or retransmitted packets/frames out of the last Nkt frames/packets transmitted to client k by the AP. In the meantime, the AP also updates the uplink transmit power of client k and instructs/directs client k to increase its uplink transmit power to the updated/new/target transmit power value for uplink transmissions as described below. If the current uplink transmit power for client k is Putk, then the new transmit power for uplink transmissions from client k to the AP is the smaller value of Putk+Pud and the maximum power supported by the client, max Puk, i.e. new Putk=min{Putk+Pud, max Puk}. Nkt, $F_T$, and Pud are design tuning parameters.

In one exemplary embodiment, a client periodically determines its packet/frame loss rate (FLRc) for its uplink transmissions to its associated AP. If the FLRc during a time interval is greater than a threshold FTc, FLRc>FTc, the client adjusts its uplink transmit power. If the current uplink transmit power for client k is Putk, the new transmit power for the client k uplink transmission to the AP is the smaller one of Putk+Pud and the maximum uplink power supported by client, max Puk, i.e. new Putk=min{Putk+Pud, max Puk}. FT and Pud are the design tuning parameters.

Figure 5:
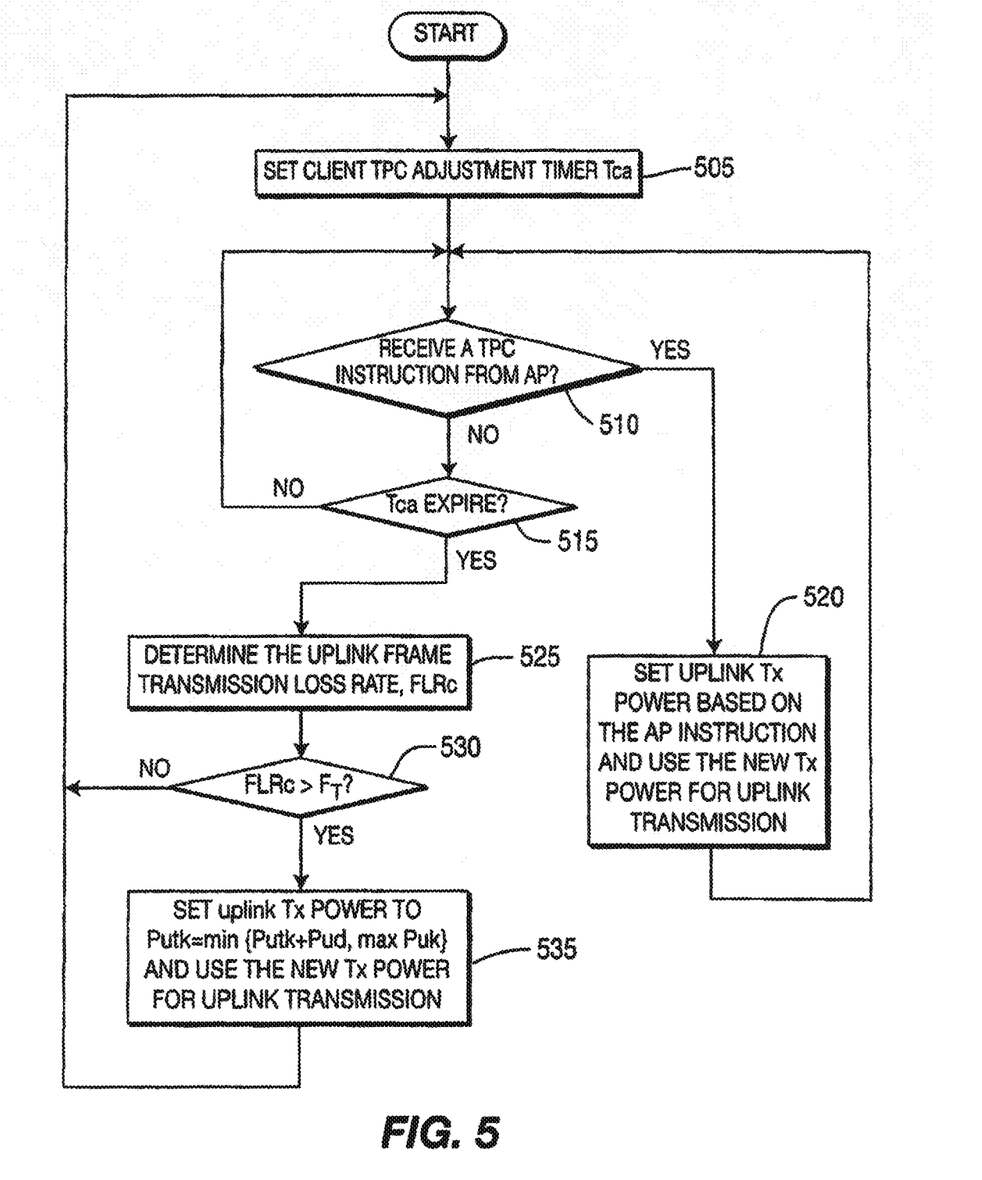
FIG. 5 is a flowchart of an exemplary embodiment of a client transmit power control (TPC) procedure in accordance with the principles of the present invention.

FIG. 5 is a flowchart of an exemplary embodiment of a client transmit power control (TPC) procedure in accordance with the principles of the present invention. At 505 the client sets/initializes a TPC adjustment timer. A test is performed at 510 to determine if the client has received a TPC adjustment message/frame/signal/instruction from the AP with which it is associated. If the client has not received a TPC adjustment message/frame/signal/instruction from the AP with which it is associated then a test is performed at 515 to determine if the TPC adjustment timer has expired. If the TPC adjustment timer has expired then at 525 the client determines the uplink packet/frame transmission loss rate. A test is performed at 530 to determine if the packet/frame transmission loss rate is greater than a threshold. If the packet/frame transmission loss rate is less than or equal to the threshold then processing continues at 505. If the packet/frame transmission loss rate is greater than a threshold the client sets/updates the uplink transmit power and uses the updated uplink transmit power in all future uplink transmissions to the AP until the uplink power is changed by the methods described herein. Processing then continues at 505.

If the client has received a TPC adjustment message/frame/signal/instruction from the AP with which it is associated then at 520 the client sets/updates its uplink transmit power based on the TPC adjustment message/frame/signal/instruction from the AP with which it is associated. The client uses the updated uplink transmit power in all future uplink transmissions to the AP until the uplink power is changed by the methods described herein.

In another exemplary embodiment, client k maintains a window of transmission status for Nckt frames that were most recently transmitted to its associated AP. If the uplink packet/frame loss rate for client k, FLRck=Ncke/Nckt>$F_{Tc}$, then client k adjust its uplink transmit power, where Nuke is the number of lost or retransmitted packets/frames out of the last Nckt frames/packets transmitted from client k to the AP. If the current uplink transmit power for client k is Putk, the new transmit power for transmissions from client k to the AP is the smaller of Putk+Pud and the maximum power supported by client k, max Puk, i.e. new Putk=min{Putk+Pud, max Puk}. Nckt, $F_{Tc}$, and Pud are design tuning parameters.

Figure 6:
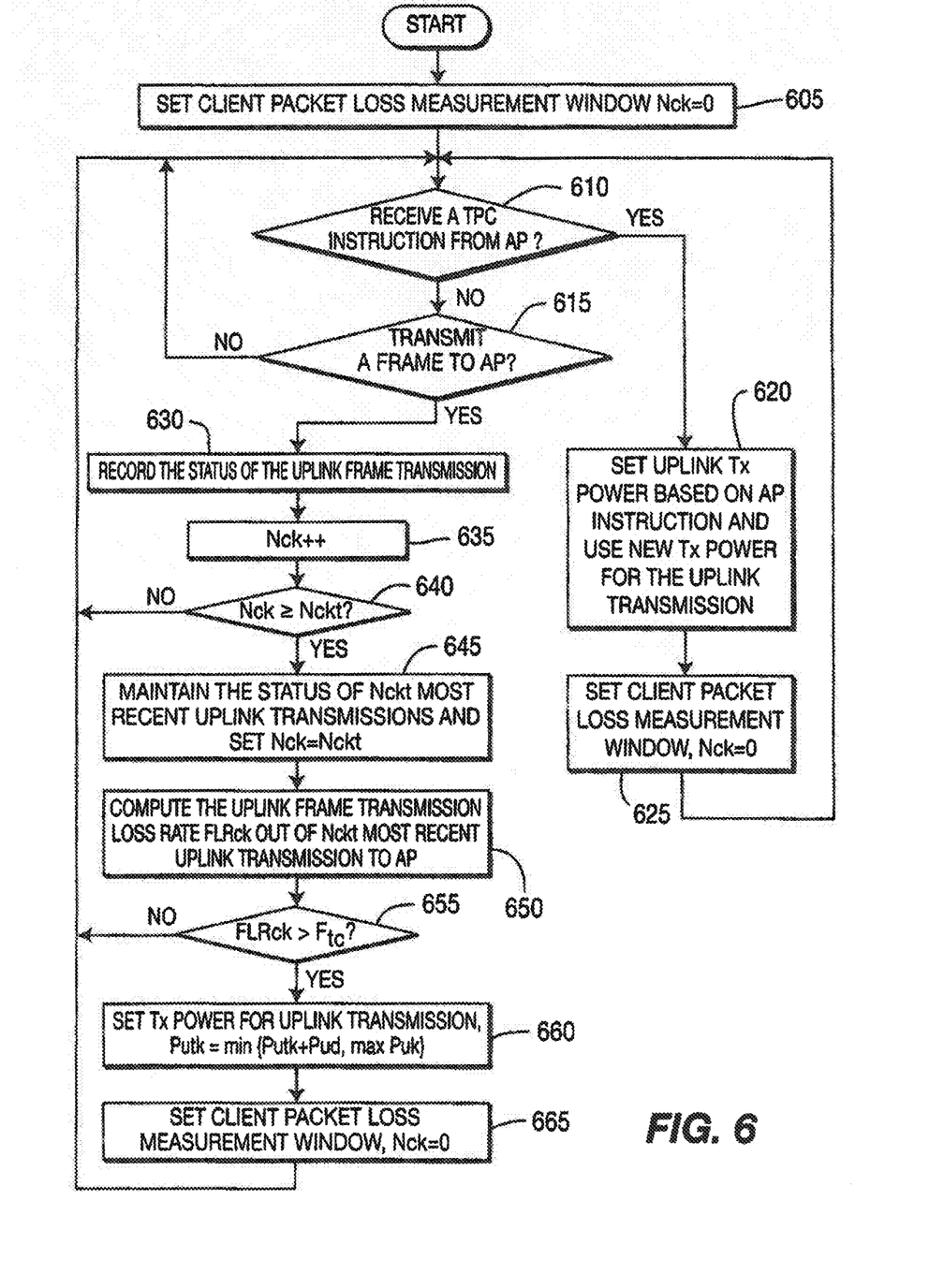
FIG. 6 is a flowchart of an exemplary embodiment of a client transmit power control (TPC) procedure when the client maintains a window of uplink transmission status in accordance with the principles of the present invention.

FIG. 6 is a flowchart of an exemplary embodiment of a client transmit power control (TPC) procedure when the client maintains a window of uplink transmission status in accordance with the principles of the present invention. At 605 the client sets/initializes its packet/frame loss measurement window. A test is performed at 610 to determine if the client has received a TPC adjustment message/frame/signal/instruction from the AP with which it is associated. If the client has not received a TPC adjustment message/frame/signal/instruction from the AP with which it is associated then a test is performed at 615 to determine if the client has transmitted any data/packets/frames to the AP with which it is associated. If the client has not transmitted any data/packets/frames to the AP with which it is associated then processing continues at 610. If the client has transmitted any data/packets/frames to the AP with which it is associated then at 630 the client records the status of the uplink data/packets/frames that it transmitted to the AP with which it is associated. At 635, the client increments the packet/frame transmission loss measurement window. A test is performed at 640 to determine if the packet/frame transmission loss window is greater than or equal to the measurement-required number of packets/frames transmitted to the AP with which this client is associated, Nckt. if the packet/frame transmission loss window is less than the measurement-required number of packets/frames transmitted to the AP with which this client is associated processing continues at 610. If the packet/frame transmission loss window is greater than or equal to the measurement-required number of packets/frames transmitted to the AP with which this client is associated then at 645 then client maintains the status of the Nckt packets/frames most recently transmitted to the AP with which this client is associated and resets the packet/frame loss measurement window to Nckt. At 650 the client computes/calculates/determines the uplink packet/frame transmission loss rate of the most recent uplink transmission to the AP with which this client is associated. A test is performed at 655 to determine if the packet/frame loss transmission rate is greater than a threshold. If the packet/frame loss transmission rate is less than or equal to the threshold then processing continues at 610. If the packet/frame loss transmission rate is greater than the threshold then at 665 the client sets/updates its uplink transmit power. The client also uses the updated uplink transmit power in all future uplink transmissions to the AP until the uplink power is changed by the methods described herein. At 670 the client resets the packet/frame loss measurement window.

If the client received a TPC adjustment message/frame/signal/instruction from the AP with which it is associated then at 620 the client sets its uplink transmit power based on the TPC adjustment message/frame/signal/instruction from the AP with which it is associated. The client also uses the updated uplink transmit power in all future uplink transmissions to the AP until the uplink power is changed by the methods described herein. At 625 the client resets the packet/frame loss measurement window. Processing then continues at 610.

It should be understood that there are described above four modes of operation. There are two modes for the AP and two modes for the client/STA as follows:

1. AP regulates transmit RF power to each client/STA individually

2. AP uses same regulated RF power to all clients/STAs based on the client with the worst reception 3. Each client/STA is responsive to a unique AP command to regulate the individual client/STA transmit power 4. All clients/STAs transmit powers are regulated to the same level via an AP command based on the client with the worst transmission to the AP with which it is associated.

As a system operation may include operating in the following modes 1 and 3, 1 and 4, 2 and 3 and finally 2 and 4.

Figure 7:
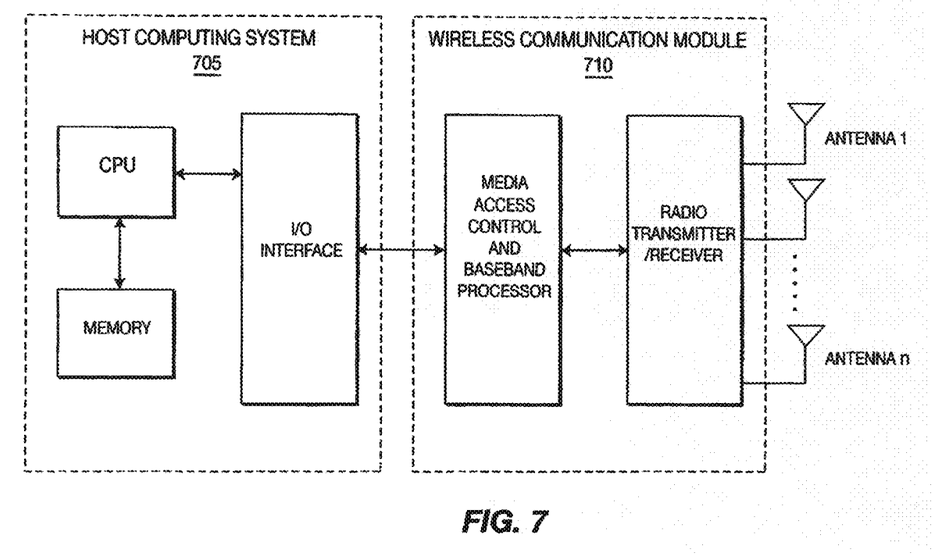
FIG. 7 is a block diagram of an exemplary implementation of the present invention.

FIG. 7 is a block diagram of an exemplary implementation of the present invention for a client/STA and/or an AP. As a client/STA and/or an AP can be a transmitter, a receiver or a transceiver, a single block diagram is used to describe these devices. Each device includes a host computing/processing system (705) and a wireless communication module (710). The host computing/processing system can be a general-purpose computer or a special-purpose computing system. The host computing/processing system can include a central processing unit (CPU), a memory and an input/output (I/O) interface. The wireless communication module can include a media access control (MAC) and baseband processor, radio transmitter/receiver, and one or more antennas. An antenna transmits and receives the radio signals. The radio transmitter/receiver performs radio signal processing. The radio transmitter/receiver may be a transceiver or a separate transmitter and receiver. The MAC and baseband processor performs MAC control and data framing, modulation/demodulation, coding/decoding for the transmission/receiving. For a client/STA, functionalities of receiving the TPC measurement request from its associated AP, determining the received signal strength, transmitting the TPC measurement report to its associated AP, determining packet/frame transmission loss rate, receiving TPC adjustment message/frame/signal/instruction from the AP with which it is associated are performed by the wireless communication module alone or by a program running on the hosting computing system that works together with the wireless communication module. For an AP, functionalities of determining packet/frame transmission loss rate, transmitting the TPC measurement request, receiving TPC measurement reports and transmitting TPC adjustment message/frame/signal/instruction are performed by the wireless communication module alone or by a program running on the hosting computing system that works with the wireless communication module.

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
    setting an adjustment timer;
    receiving, by a transmitter, a report from at least one associated client, wherein said report includes data indicating received signal strength, client transmit power level, and at least one of link margin and receiver sensitivity;
    setting a downlink transmit power level for each of the at least one associated client responsive to said report;
    using said downlink transmit power level for data transmissions to each of the at least one associated client;
    upon expiration of said adjustment timer, determining a downlink data loss rate using a number of retransmission requests in a time interval set by said adjustment timer;
    if said downlink data loss rate is greater than a threshold, adjusting said downlink transmit power level responsive to said downlink data loss rate for each of the at least one associated client; and
    using a data loss measurement window to maintain status of most recent data transmissions for each of the at least one associated client.

2. The method according to claim 1, further comprising calculating a downlink margin responsive to said receiver sensitivity.

3. The method according to claim 1, wherein said downlink data loss rate determination further comprises:
    transmitting data to each of the at least one associated client; and
    recording said status of said data transmission.

4. A method, said method comprising:
    setting an adjustment timer;
    receiving, by a receiver, a request for a report, wherein said report includes data indicating received signal strength, client transmit power level, and at least one of link margin and receiver sensitivity;
    transmitting the requested report;
    receiving an instruction to use an uplink transmit power level;
    setting said uplink transmit power level;
    using said uplink transmit power level;
    upon expiration of said adjustment timer, determining an uplink data loss rate in a time interval set by said adjustment timer;
    comparing said uplink data loss rate to a threshold;
    if said uplink data loss rate is greater than said threshold, adjusting said uplink transmit power level responsive to said uplink data loss rate; and
    using a data loss measurement window to maintain status of most recent data transmissions.

5. The method according to claim 4, further comprising;
    measuring received signal strength; and
    determining one of said link margin and receiver sensitivity.

6. The method according to claim 4, wherein said uplink data loss rate determination further comprises:
    transmitting data to an access point; and
    recording said status of said data transmission.

7. An apparatus, comprising:
an adjustment timer;
means for receiving, by a transmitter, a report from at least one associated client, wherein said report includes data indicating received signal strength, client transmit power level, and at least one of link margin and receiver sensitivity;
means for setting a downlink transmit power level for each of the at least one associated client responsive to said report;
using said downlink transmit power level for data transmissions to each of the at least one associated client;
means for determining a downlink data loss rate using a number of retransmission requests in a time interval set by said adjustment timer upon expiration of said adjustment timer;
means for adjusting said downlink transmit power level responsive to said downlink data loss rate for each of the at least one associated client if said downlink data loss rate is greater than a threshold; and
means for using a data loss measurement window to maintain status of most recent data transmissions for each of the at least one associated client.

8. The apparatus according to claim 7, further comprising means for calculating a downlink margin responsive to said receiver sensitivity.

9. The apparatus according to claim 7, wherein said downlink data loss rate determination means further comprises:
means for transmitting data to said associated client; and
means for recording said status of said data transmission.

10. An apparatus, comprising:
an adjustment timer;
means for receiving a request for a report, wherein said report includes data indicating received signal strength, client transmit power level, and at least one of link margin and receiver sensitivity;
means for transmitting said report;
means for receiving an instruction to use an uplink transmit power level;
means for setting said uplink transmit power level;
means for using said uplink transmit power level;
means for determining an uplink data loss rate in a time interval set by said adjustment timer upon expiration of said adjustment timer;
means for comparing said uplink data loss rate to a threshold;
means for adjusting said uplink transmit power level responsive to said comparison; and
means for using a data loss measurement window to maintain status of most recent data transmissions.

11. The apparatus according to claim 10, further comprising;
means for measuring received signal strength; and
means for determining one of said link margin and receiver sensitivity.

12. The apparatus according to claim 10, wherein said uplink data loss rate determination means further comprises:
means for transmitting data to an access point; and
means for recording said status of said data transmission.

13. An apparatus, comprising:
an interface for receiving a report from at least one associated client, wherein said report includes data indicating received signal strength, client transmit power level, and at least one of link margin and receiver sensitivity; and
a processing unit, said processing unit
setting a adjustment timer;
setting a downlink transmit power level for each of the at least one associated client responsive to said report;
using said downlink transmit power level for data transmissions to each of the at least one associated client;
upon expiration of said adjustment timer determining a downlink data loss rate using a number of retransmission requests in a time interval set by said adjustment timer;
if said downlink data loss rate is greater than a threshold, adjusting said downlink transmit power level responsive to said downlink data loss rate for each of the at least one associated client; and
using a data loss measurement window to maintain status of most recent data transmissions for each of the at least one associated client.

14. The apparatus according to claim 13, wherein said processing unit further calculates a downlink margin responsive to said receiver sensitivity.

15. The apparatus according to claim 13, further comprising a memory and said processing unit determines said downlink data loss rate by
transmitting data to each of the at least one associated client; and
recording said status of said data transmission in said memory.

16. An apparatus, comprising:
a transmitter/receiver for receiving a request for a report from an access point and transmitting the report, wherein said report includes data indicating received signal strength, client transmit power level, and at least one of link margin and receiver sensitivity; and
a media access control processor, wherein said media access control processor
sets a adjustment timer;
receives an instruction to use an uplink transmit power level;
sets said uplink transmit power level;
uses said uplink transmit power level;
upon expiration of said adjustment timer determines an uplink data loss rate in a time interval set by said adjustment timer;
compares said uplink data loss rate to a threshold;
adjusts said uplink transmit power level responsive to said comparison; and
uses a data loss measurement window to maintain status of most recent data transmissions.

17. The apparatus according to claim 16, wherein said media access control processor further
measures received signal strength; and
determines one of said link margin and receiver sensitivity.

18. The apparatus according to claim 16, wherein said transmitter/receiver further transmits data to an access point; and
said media access control processor records said status of said data transmission.

* * * * *